United States Patent [19]
Knebel

[11] 3,729,933
[45] May 1, 1973

[54] DRIVING ARRANGEMENT FOR RAIL VEHICLES, ESPECIALLY HIGH OUTPUT SELF-PROPELLED RAIL VEHICLES

[75] Inventor: Alfred Knebel, 43 Essen-Bredeney, Germany

[73] Assignee: Fried. Krupp Gesellschaft mit beschrankter Haftung, Essen, Germany

[22] Filed: Nov. 12, 1970

[21] Appl. No.: 88,855

[30] Foreign Application Priority Data

Nov. 12, 1969 Germany..................P 19 56 742.1

[52] U.S. Cl.................................................60/102
[51] Int. Cl...............................................F01d 13/00
[58] Field of Search ....................60/97, 102; 290/4; 180/54 C; 105/130, 26 D, 34 P

[56] References Cited

UNITED STATES PATENTS

| | | | |
|---|---|---|---|
| 1,641,253 | 9/1927 | Donon | 105/34 P |
| 2,630,871 | 3/1953 | Simpkins | 60/97 B |
| 2,911,541 | 10/1959 | Neufville et al. | 290/4 R |
| 3,197,962 | 8/9165 | Suttles | 60/97 B |
| 3,388,684 | 6/1968 | Gros et al. | 60/11 X |
| 3,512,277 | 5/1970 | Stuller | 60/97 X |

FOREIGN PATENTS OR APPLICATIONS

| | | | |
|---|---|---|---|
| 209,111 | 1924 | Great Britain | 60/102 |

*Primary Examiner*—Martin P. Schwadron
*Assistant Examiner*—Allen M. Ostrager
*Attorney*—Walter Becker

[57] ABSTRACT

A driving arrangement, especially for a high performance rail vehicle having at least two independant sources of power and at least two driven axles and a power transmission connecting said sources of power with said axles and adjustable so that when only one source of power is operating it will supply power to a greater number of axles than when both sources of power are operating.

6 Claims, 10 Drawing Figures

FIG. 1
PRIOR ART

Inventor:
Alfred Knebel

Patented May 1, 1973

Inventor:
Alfred Knebel
By
Walter Becker

DRIVING ARRANGEMENT FOR RAIL VEHICLES, ESPECIALLY HIGH OUTPUT SELF-PROPELLED RAIL VEHICLES

The present invention relates to a driving arrangement for rail vehicles, especially for high output self-propelled rail vehicles which comprise at least two driving units independent of each other, a power conveying installation composed of mechanical, hydraulic or electrical components or combinations of such components, and at least two driven axles.

With heretofore known driving systems of the above mentioned type for rail vehicles, it is, in view of the non-variable power flow between the driving units and the driven axles during operation, possible to bring about a change in the pulling force at the circumference of the individual driving wheels only by changing the driving output of the individual driving units, but it is not possible to obtain such change by distributing the non-varying driving power of a driving unit also over such axles which, while simultaneously taking in another driving unit for developing the traction power are driven only by the latter.

With the ratio customary for most self-propelled rail vehicles driven by internal combustion engines, between the driving power and the axle pressure of the driven axles, the velocity range in which the pulling force at full driving power is located above the friction limit of the vehicle is, in most instances, low and can be passed through by the vehicle in a short period of time. Moreover, with such vehicles, as driving engines, primarily Diesel engines, are employed, the specific fuel consumption of which remains within economically permissible limits for all partial load ranges which are feasible for the vehicle and can be controlled in fine steps without great expenses.

With self-propelled rail vehicles with particularly high driving power, and particularly with such self-propelled rail vehicles which are employed for speeds that must be considerably higher than presently customary speeds, the axle pressures must be considerably reduced over slower vehicles in order also for these vehicles to be able to use as much of the present rail network as possible without expensive reconstruction of the upper structure.

The ratio between the driving power and the axle pressure, which ratio determines the width of the velocity range in which the pulling force at full driving power of all driving units exceeds the friction limit will, therefore, with high speed, high output, self-propelled rail vehicles, increase considerably over the presently customary values. This is due in the first place to the increase in the driving power, and secondly due to the reduction of the axle pressure. As a result thereof, the velocity limit above which it is only possible to convert the full driving power for the driving wheels into pulling forces without the danger of wheelslip will be placed already into a range in which the maximum speeds of many present self-propelled rail vehicles are located and in which also high speed, high output vehicles, already due to the common use of the rail network for considerably slower vehicles have to move, and not only for a short period of time.

Inasmuch as for high output self-propelled rail vehicles driven by internal combustion engines, driving installations including gas turbines are, for reasons of weight, employed from certain maximum speeds on, it will be appreciated that within the velocity range in which it is not possible to convey the full output of the driving installation to the rail, the specific fuel consumption of the gas turbine in the partial load stages is decisive for judging the economy of the driving installation. It is a well-known fact that the specific fuel consumption of the gas turbine in partial load stages is relatively high.

The unfavorable partial load behavior of a gas turbine from start to that velocity above which the full driving power of the individual driving units can be safely taken advantage of without danger of shimmying and regardless of the weather, would therefore result in rather high fuel consumption with high speed gas turbine self-propelled rail vehicles which have a high output and which are equipped with known driving systems, characterized by the association of the driven axles (non-variable with regard to power flow) to the individual units of the driving installation.

It is, therefore, an object of the present invention to overcome the above mentioned drawbacks by the provision of a driving system which, above all, will be suitable for only low axle pressure permitting gas turbine self-propelled rail vehicles which have a high driving power and high speed.

It is another object of this invention to provide a driving system as set forth in the preceding paragraph which will take full advantage of the friction weight of all driven axles even when the number of the units making up the driving installation and taking part in the traction is reduced.

It is still another object of this invention to provide a driving system as referred to in the preceding paragraphs which will result in a favorable fuel consumption over the entire velocity range.

These and other objects and advantages of the invention will appear more clearly from the following specification, in connection with the accompanying drawings, in which:

FIGS. 5 to 10 respectively illustrate further embodiments and developments of the present invention over the embodiment of FIG. 2, which latter merely shows the basic principle of the invention.

More specifically.

The arrangement of FIG. 8 differs from that of FIG. 6 primarily in that the branch coupling has been replaced by a first torque converter driven by a gas turbine, and supplemented by a second torque converter driven by another gas turbine.

The above outlined objects have been realized by a suitable arrangement of mechanical hydraulic or electric torque converters and/or couplings and other transmission parts or devices which are suitable for distribution and/or branching off of mechanically, hydraulically, or electrically transmitted traction power, by means of which the power flow connection of the driven axles to the individual independent driving units may, during operation, be varied in such a way that all driven axles of the vehicle which when the driving installation fully takes part in the traction are in the maximum speed range as to their power flow associated with the independent units of said installation while under load, but are adapted when disengaging of one or more of said driving units, to be driven by the driving unit or units which further take part in the traction.

Figure 1:
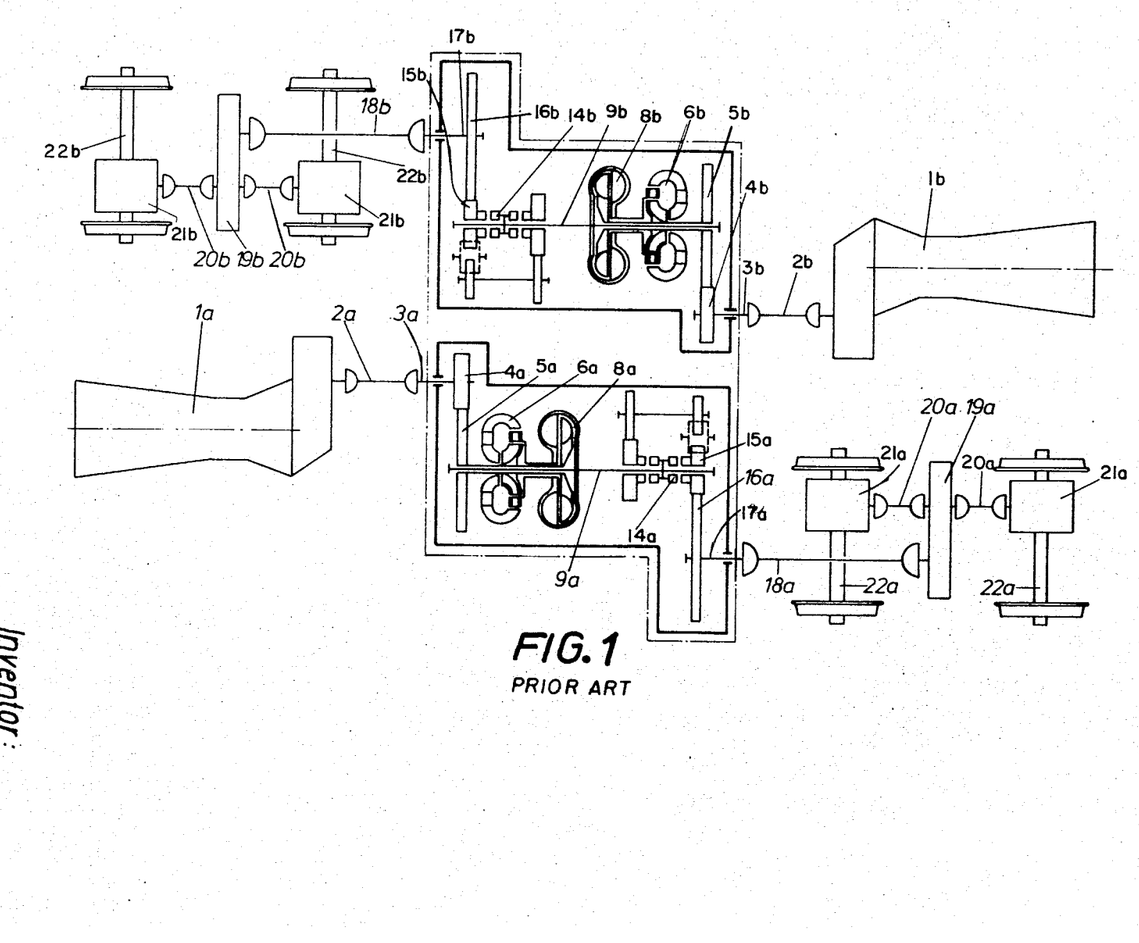
FIG. 1 illustrates a heretofore known driving system with hydraulic power transfer and the employment of gas turbines.
Figure 2:
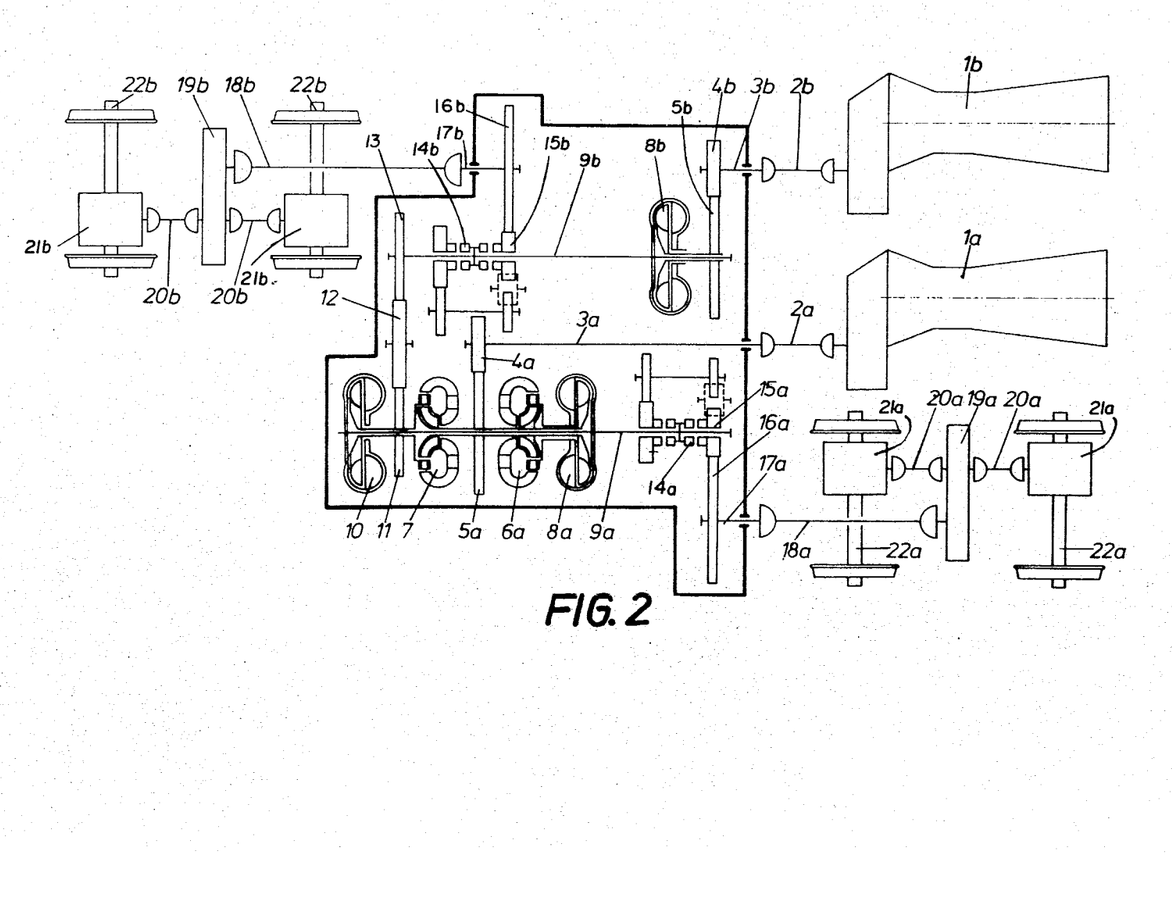
FIG. 2 diagrammatically illustrates a driving system according to the present invention, in which the driving engines may have associated therewith various driven axles.

Referring now to the drawings in detail, the main feature of the invention, namely, the change in the connection of the power flow of the driven axles with regard to the independent units of the driving installation depending on their involvement in the traction is first emphasized by a comparison of a heretofore known driving system diagrammatically illustrated in FIG. 1 with the hydraulic transferring system for rail vehicles diagrammatically illustrated in FIG. 2.

With the driving system illustrated in FIG. 1 and characteristic for heretofore known arrangements with hydraulic power transfer, the driving power developed by the gas turbines 1a and 1b is conveyed to the driven axles 22a, 22b through the intervention of two power paths which are completely independent of each other.

The first power flow path or strand a, which starts at the gas turbine 1a, passes with the driving direction which gives the shortest power flow and which is described here for the sake of simplicity, through the joint shaft 2a, transmission drive shaft 3a, gears 4a and 5a, hydrodynamic torque converter 6a in the lower velocity range or hydrodynamic coupling 8a in the upper velocity range, intermediate shaft 9a, direction control sleeve 14a (in engagement with 15a), pair of gears 15a and 16a, transmission output shaft 17a, joint shaft 18a, distributing transmission 19a, joint shafts 20a, axle drive 21a, to the driven axles 22a, and at the circumference of the driving wheels is converted into pulling power.

Figure 3:
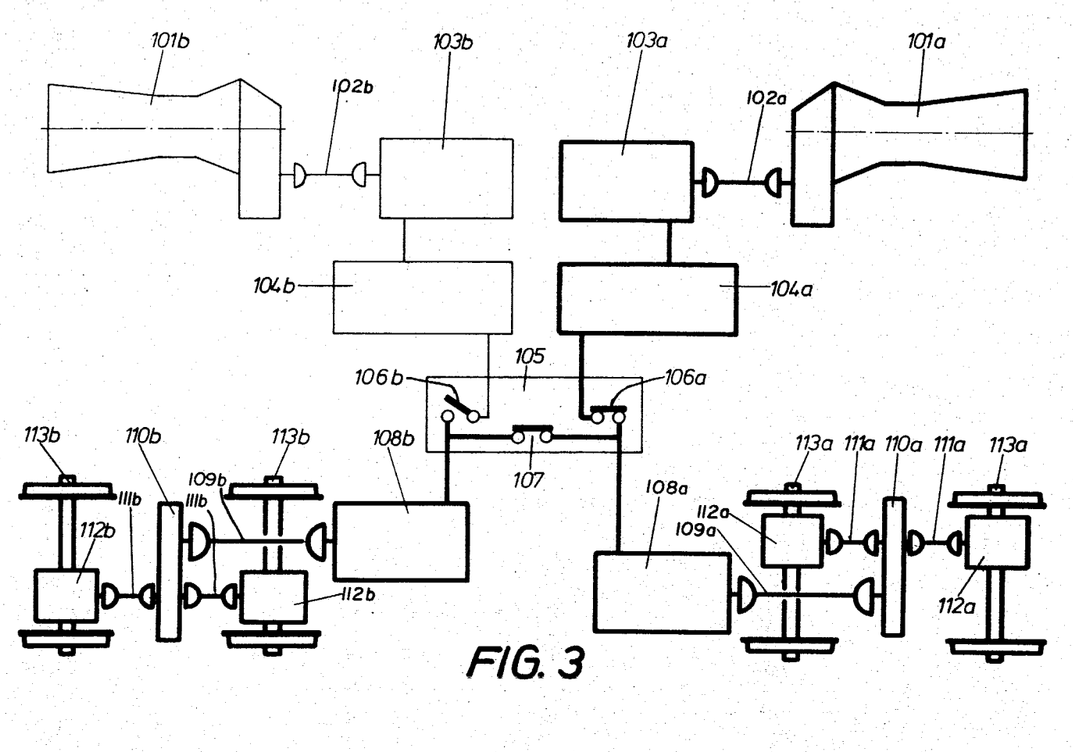
FIGS. 3 and 4 illustrate a driving system according to the present invention with electric power transfer.
Figure 4:
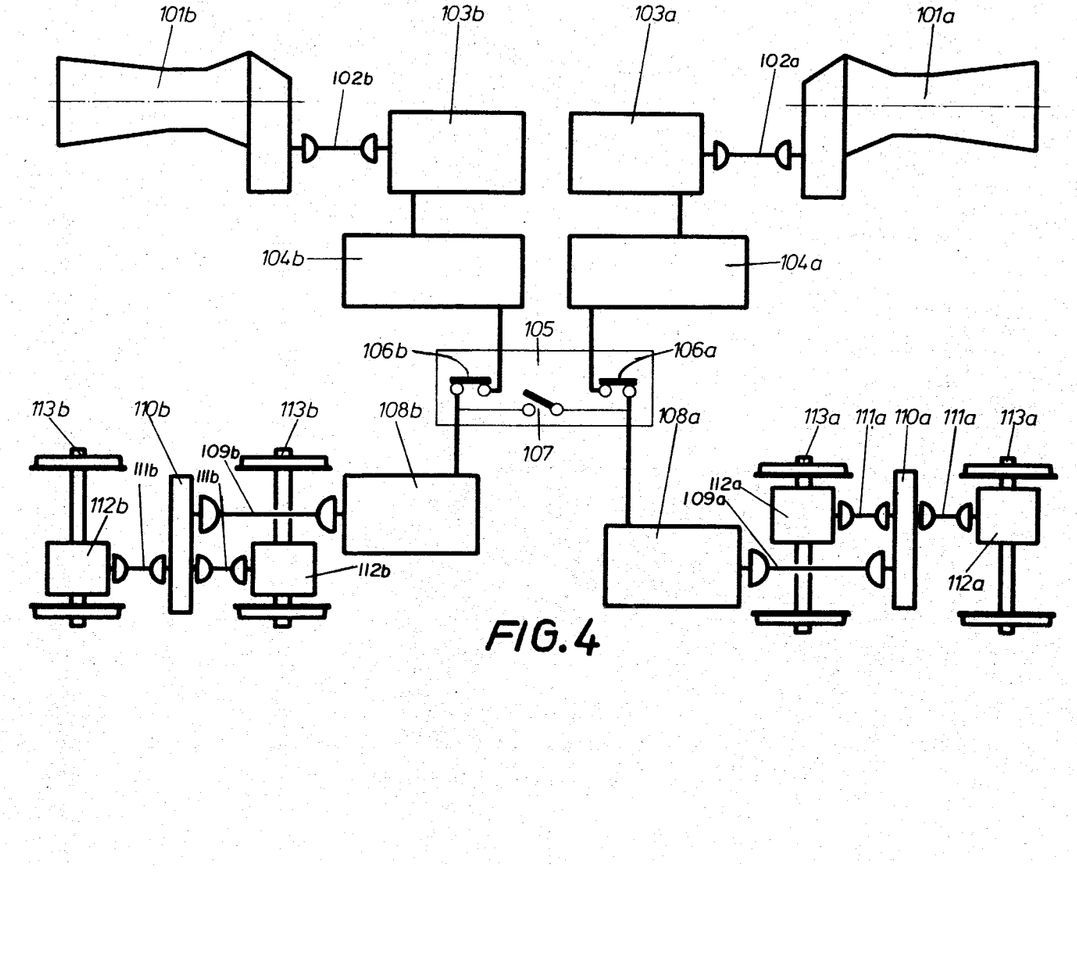

The second power flow path or strand b which in the entire velocity range is symmetrical with the above described first power path flow or strand a, but is completely separate therefrom passes from the gas turbine 1b through elements designated with the same reference numerals as used in connection with the first power flow path, but with the character b instead of a, to the driven axles 22b. It should be noted that merely for a better illustration the driving wheels of the axles 22b and 22a in FIG. 1 and similarly in FIGS. 2, 5–10 are laterally offset but that actually they move on the same track as shown in FIGS. 3 and 4 for the driving wheels of the axles 113a and 113b.

As will be seen from FIG. 1, with the arrangement shown therein representing the heretofore characteristic driving system, there does not exist the possibility to transfer the driving power of the gas turbine 1a additionally to the axles 22b when the gas turbine 1b does not take part in the traction. This is due to the fact that the axles 22a are not changeably associated with the gas turbine 1a, and the axles 22b are not changeably associated with the gas turbine 1b.

For designating those parts of the driving system in FIG. 2 which problem-wise and function-wise correspond to the parts of FIG. 1, the same reference numerals have been used as in FIG. 1. The flow strand or flow paths designations a and b taken from FIG. 1 also into FIG. 2 refer to parts which in both systems appear, whereas the reference numerals without index in FIG. 2 characterize only such parts which differentiate the invention from the known system of FIG. 1. These parts are the hydrodynamic torque converter 7, the hydrodynamic coupling 10 and gears 11, 12 and 13.

The new driving system illustrated in FIG. 2 with variable association of the driven axles with the driving engine operated in the following manner: Within the lower velocity range, only the power of the gas turbine 1a is employed for the traction. The power flow starting from the gas turbine passes through joint shaft 2a, main transmission driving shaft 3a, pair of gears 4a and 5a to the hydrodynamic torque converters 6a and 7 which distribute the driving power conveyed thereto to the driven axles 22a and 22b in such a way that one strand of the power flow branching out at the gear 5a passes from the latter to the hydrodynamic torque converter 6a and from there through the intermediate shaft 9a, direction control sleeve 14a, (in engagement with 15a), pair of gears 15a and 16a, transmission output shaft 17a, joint shaft 18a, distributing transmission 19a, joint shafts 20a, axle drive 21a to the axles 22a. The second strand passes from gear 5a to the hydrodynamic torque converter 7 and through gears 11, 12, 13, intermediate shaft 9b, direction control sleeve 14b (in engagement with 15b), pair of gears 15b and 16b, main transmission output shaft 17b, joint shaft 18b, distributing transmission 19b, joint shafts 20b and axle drive 21b to the axles 22b.

In view of the distribution of the driving output of the gas turbine 1a to two commonly driven torque converters 6a and 7 which are only on the primary side rigidly connected to each other, there is realized a likewise common drive of the axles 22a and 22b. However, the drives of these axles are independent of each other and are elastic, and the axles 22a and 22b are interconnected only through the hydraulic circuits of the torque converters 6a and 7. This driving system has, over the system of FIG. 1, the great advantage that the pulling force developed by the gas turbine 1a can be distributed over twice the number of driven axles as is the case in FIG. 1.

Assuming the same friction surfaces and further assuming that that section of the velocity range is involved in which the pulling force produced by the gas turbine 1a is above the friction limit of the vehicle, or assuming that with pulling forces below the friction limit, the driving power of the gas turbine 1a is sufficient to overcome the traction resistance (which in the power class of high speed gas turbine self-propelled vehicles may be assumed up to the presently prevailing maximum velocity ranges of self-propelled Diesel vehicles), the invention makes it possible that in view of the distribution of the same pulling force to double the number of driven axles, the gas turbine 1a when alone in operation will be able to furnish a traction power which is twice as high as the traction power developed by the gas turbines 1a and 1b in common of the FIG. 1 system which gas turbines of FIG. 1 have both to work in the same low partial stage in view of the fact that power flow-wise they cannot be variably connected to the axles 22a, 22b and therefore in the selected section of the velocity range cannot individually exceed the 50 percent partial load stage.

In addition to the important economic advantage that with the same total power development of the installation, the invention permits the operation with a smaller number of gas turbines in higher and therefore more economical partial load stages than the system of FIG. 1 which operates with the greater number of gas turbines in lower partial load stages and therefore in specific fuel consumption ranges which are less favorable, it will be appreciated that from the distribution of the same pulling force to a greater number of driven en axles, the new driving system has the advantage that when increasing the pulling force by increasing the traction power delivered by the gas turbine, the steps provided for the control of the gas turbine may be greater in order to convey the same increase in pulling power per axle to the rail than is the case with a distribution to a few axles.

The greater steps made possible by the invention in the partial load stages to be controlled of the gas turbine which at the wheel circumference result in the same pulling force stages, as the fine stage comparative system to be controlled will permit a simpler and thereby less expensive control devices for the control of the gas turbine and will greatly increase the economy of such vehicles.

The above outlined advantages of the new driving system of FIG. 2 are not limited merely to the lower velocity range which in view of the hydraulic circuits involved may also be termed the converter range. Also in the upper velocity range to which in the embodiment for the hydraulic power transfer the coupling range corresponds, circumstances may occur which for instance when pulling shorter and lighter trains, or during a downward drive, or when an excess in acceleration reserves occur may reduce the requirement as to traction power considerably to such an extent that for the movement of the train, the driving power of the gas turbine 1a may also be sufficient for the maximum velocity range. By the power branching system, as will be described further below, the invention also makes it possible that the traction power of the gas turbine 1a in such instance also during coupling operation will be distributed onto all axles of the vehicle which means onto the axles 22a and 22b in FIG. 2 in the same manner as in the converter range whereby all advantages of the complete exploitation of the friction weight can apply to the entire velocity range and to all load instances.

In such an instance, the power flow in FIG. 2 passes from the gas turbine 1a through the joint shaft 2a, main transmission-driving shaft 3a, pair of gears 4a and 5a, and through the hydrodynamic coupling 8a which transmits the entire driving output of the gas turbine, to the intermediate shaft 9a. From the intermediate shaft 9a there is branched off a portion of the power developed by the gas turbine 1a (in this example expediently half the power developed by the gas turbine 1a). This branching off is effected by the hydrodynamic coupling 10 which is driven by said intermediate shaft 9a. The thus branched-off power is, through gears 11, 12 and 13, furnishing a corresponding transmission ratio passed onto the intermediate shaft 9b. The intermediate shafts 9a and 9b will each transmit half the traction power delivered by the gas turbine 1a and convey the same through direction control sleeve 14a (in engagement with 15a), pair of gears 15a and 16a, main transmission output shaft 17a, joint shaft 18a, distributing transmission 19a, joint shafts 20a, and axle transmission 21a to the axles 22a and furthermore is conveyed through direction control sleeve 14b (in engagement with 15b), gear pairs 15b and 16b, main transmission output shaft 17b, joint shaft 18b, distributing transmission 19b, joint shafts 20b, and axle transmission 21b to the axles 22b.

The load conditions as described so far in the lower as well as in the upper velocity range results in a power flow-wise association of all driven axles 22a and 22b in FIG. 2 with the gas turbine 1a while the gas turbine 1b did not develop any traction power. When both gas turbines 1a and 1b take part in the development of the traction which is provided only in the upper velocity range, it will be appreciated that by a change in the circuit of the working hydraulic circuits, also automatically a change in the power flow-wise association of the driven axles occurs so that the axles 22a of the gas turbine 1a and the axles 22b of the gas turbine 1b will be coordinated in the same manner as is the case with the known system of FIG. 1 within all velocity ranges. The transfer of the driving power from the gas turbine 1a to the axles 22a is effected through the intervention of joint shaft 2a, transmission driving shaft 3a, gear pairs 4a and 5a, hydrodynamic coupling 8a, intermediate shaft 9a, direction control sleeve 14a (in engagement with 15a), gear pair 15a and 16a, transmission output shaft 17a, joint shaft 18a, distributing transmission 19a, joint shafts 20a, and axle transmission 21a. Independently of this power flow, the driving power of the gas turbine 1b is conveyed onto the axles 22b through the intervention of the joint shaft 2b, transmission shaft 3b, pair of gears 4b, 5b, hydrodynamic coupling 8b, intermediate shaft 9b, direction control sleeve 14b (in engagement with 15b), pair of gears 15b and 16b, transmission output shaft 17b, joint shaft 18b, distributing transmission 19b, joint shafts 20b and axle transmission 21b.

The modification according to the present invention, as illustrated in FIGS. 3 and 4, refers to a drive system with electric power transfer. Since with regard to the type and number of driving motors and the current supply systems therefor, numerous combinations are feasible, the present invention will be limited only to the illustration of the main units of the electric power transfer installation in the form of a general block showing and the pertaining function kept rather general. The coordination of the driven axles 113a and 113b to a gas turbine which alone develops the driving power, its illustrated in FIG. 3 in solid heavy lines. The generator 103a which is driven by the gas turbine 1a, through the intervention of the joint shaft 102a, feeds the drive motors 108a and 108b of the axle groups 113a and 113b through the control and regulating means 104a which, depending on the type of the current supply, may also be considered as current converter or inverter, and through the intervention of the distributor group 105. With the disconnection switch 106a and the current supply installation a and the group disconnection switch 107 in closed position while the disconnection switch 106b of the current supply installation b is open, the drive motors 108a and 108b will, as illustrated in FIG. 3, be fed only by the generator 103a, and will drive the axles 113a through the joint shaft 109a, distributing transmission 110a, joint shaft 111a, and axle transmission 112a and respectively through the joint 109b, distributing transmission 110b, joint shaft 111b and axle transmission 112b. The drive of the axles 113a and 113b may also be effected only by the gas turbine 101b and the current supply of the drive motors 108a and 108b may be effected through the generator 103b through the control and regulating installation 104b when the disconnection switch 106a of the current supply installation a is open and the group disconnection switch 107 as well as the disconnection switch 106b of the current supply installation b are closed.

If the power of one gas turbine is no longer sufficient for moving the vehicle and the train connected thereto and when the friction conditions permit the adding of the second gas turbine to the power supply, the current supply of the drive motors 108a and 108b is as indicated in FIG. 4 by heavy lines, separated from each other by opening switch 107, as a result of which, the axles 113a of the gas turbine 101a and the axles 113b of the gas turbine 101b will be coordinated with each other power flow-wise.

The change in the power flow coordination of the driven axles with the gas turbines as driving engines and the driving motors with the generators could expediently be effected by using devices which are also simultaneously usable for other purposes and which could be suitable for closing and interrupting of circuits, for instance, relays of drive motors.

The embodiments with a hydrodynamic and an electric power transmission take, for the sake of simplicity, into consideration only driving arrangements comprising two gas turbines and two axle groups with two driven axles each. An increase in the number of gas turbines and/or axle groups, for instance, by the drive of axle groups or individual axles outside the self-propelled vehicle and/or increase in the number of the driven axles per axle group in the self-propelled vehicle would not affect the employment of the new drive system over comparable heretofore known systems.

The embodiment according to FIG. 2 illustrates a hydrodynamic power transmission with a converter and a coupling stage. The change in the number of these hydraulic circuits which have to be designed in conformity with the individual sections of the velocity range, or the employment of additional coupling stages or converter stages instead of coupling stages would be possible with the driving system according to the invention without any difficulties.

In the embodiment for the electric power transmission, a group drive motor has been taken into consideration in FIGS. 3 and 4 for each axle group. The employment of the drive system according to the invention with individual drive would also be possible by corresponding disconnecting switch combinations without encountering any difficulties.

FIGS. 5 to 10 illustrate further embodiments for the further development of the hydrodynamic example of FIG. 2 which merely shows the basic principle of the invention.

Figure 5:
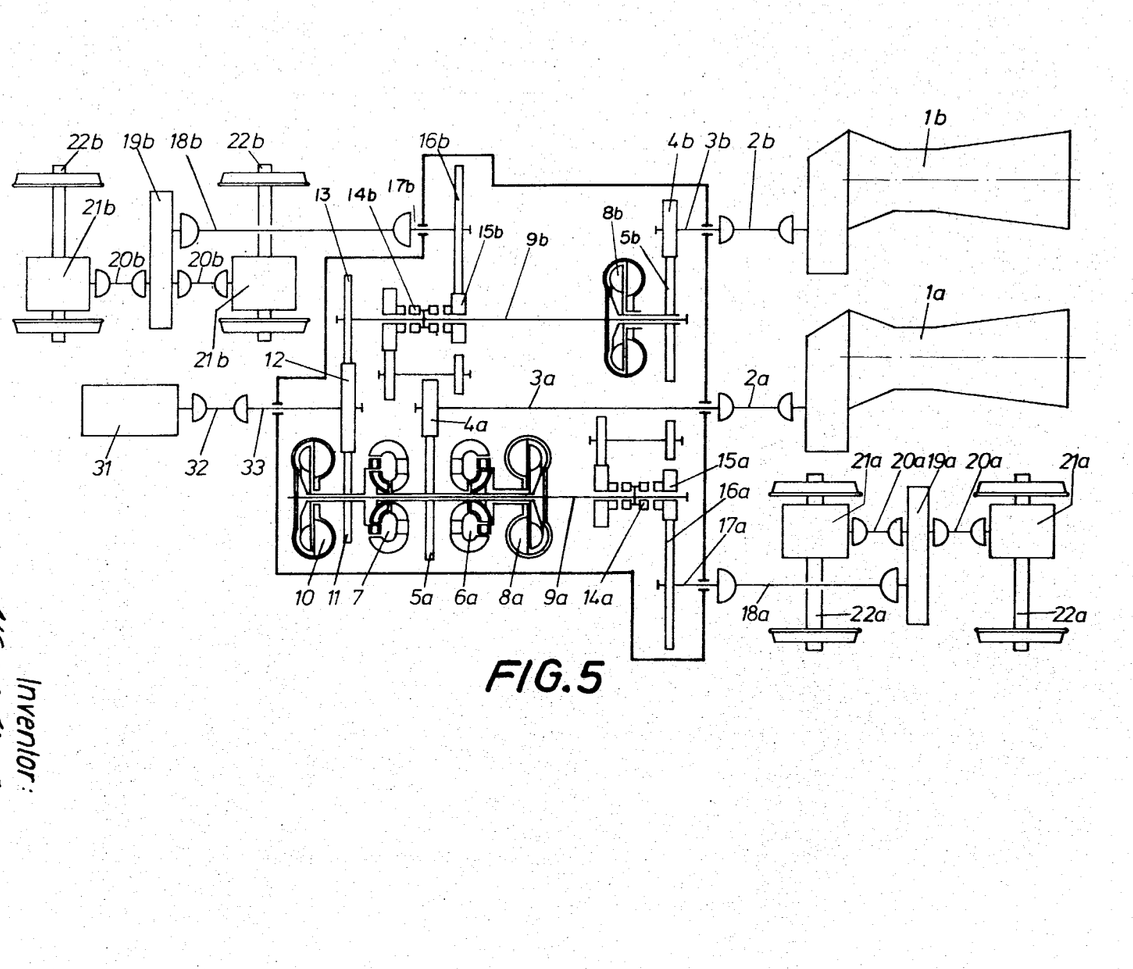
FIG. 5 shows an embodiment which differs from the driving system of FIG. 2 by the employment of a current supply installation, a flexible shaft and a driving shaft.

The embodiment of the invention as illustrated in FIG. 5 differs from the drive system of FIG. 2 in that the drive system of FIG. 2 has been supplemented by the elements designated with the reference numerals 31, 32 and 33. The auxiliary machine or machine group or the current supply installation 31 for supplying current to auxiliary devices is operatively connected to the intermediate shaft 9b through the intervention of the joint shaft 32, the drive shaft 33, and gears 12 and 13. Inasmuch as the intermediate shaft 9b of self-propelled vehicles ready for operation is connected to the rail through the direction control sleeve 14b (in engagement with 15b), pair of gears 15b, 16b, transmission output shaft 17b, joint shaft 18b, distributing transmission 19b, joint shafts 20b, axle transmission 21b and axles 22b and, independently of the driving direction of the vehicle always has the same direction of rotation, the said intermediate shaft 9b is suitable for driving auxiliary machines which have to be driven only when the vehicle is in motion or which auxiliary devices have to be driven under all circumstances when the vehicle is in motion, but driving machines necessary for traction are inoperative. Such auxiliary machines may be blowers or ventilators necessary for withdrawing the heat caused by a hydrodynamic braking operation.

In view of the connection between the joint shaft 32 and the axles 22b for effecting a torque transfer, the device 31 may also represent an auxiliary driving machine for the traction.

Figure 6:
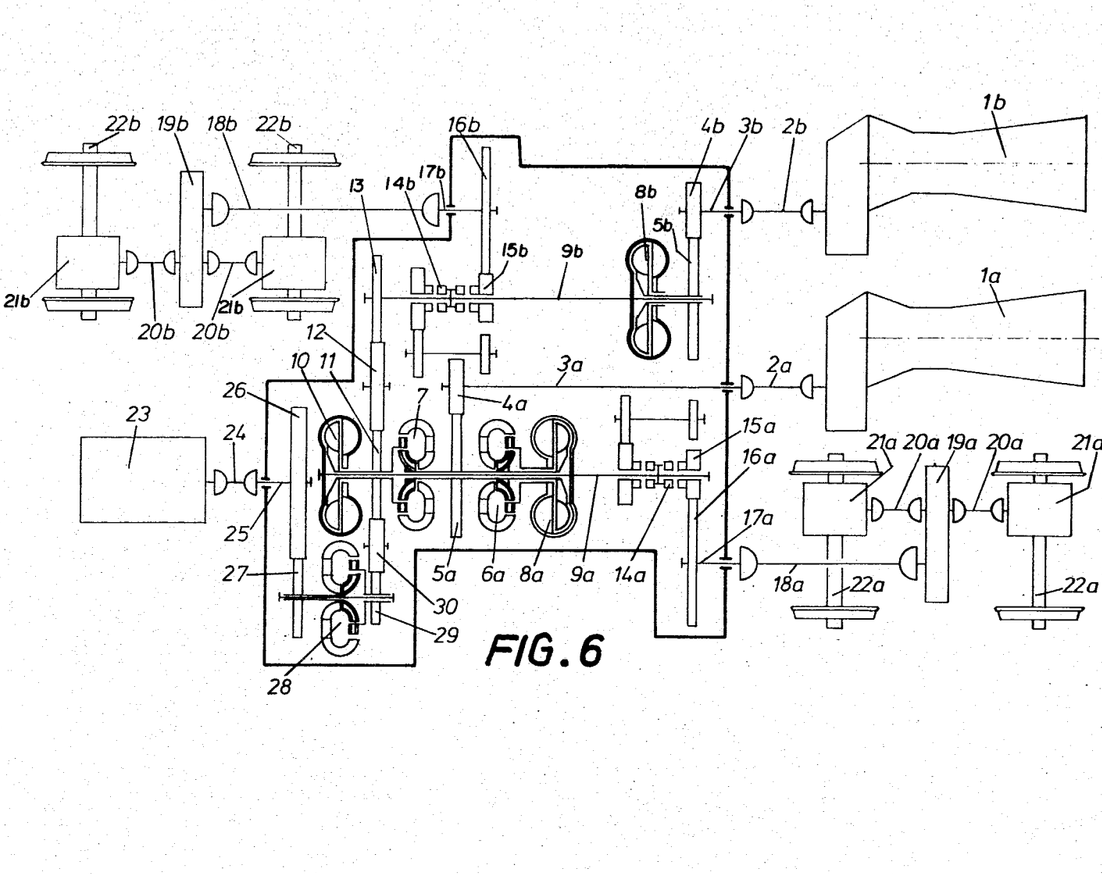
FIG. 6 shows the hydrodynamic embodiment of FIG. 2 supplemented by a hydraulic traction auxiliary drive.

FIG. 6 illustrates the hydrodynamic example of FIG. 2 supplemented by a hydraulic traction auxiliary drive. The internal combustion engine 23 which is primarily provided for the drive of the auxiliary machine of the train and for the electric train heating system or the air conditioning installation may, within certain velocity ranges, for instance, during movements within the areas of railroads, be used for the traction. To this end, the system illustrated in FIG. 6 is supplemented by a hydrodynamic torque converter 28 which is driven by the combustion engine 23 through the intervention of joint shaft 24, drive shaft 25 and pair of gears 26, 27. The output of the converter 28 and the connection with the gear 11 which drive the axles 22b as described above is effected through the gears 29 and 30. This connection of the output of the converter 28 (driven by the auxiliary driving machine 23) to the gear 11 which also represents the output member of the converter 7 driven by the gas turbine 1a permits the superimposing of the power delivered by the auxiliary drive for the traction over the power portion developed or furnished by the gas turbine 1a, which power portion is transmitted by the converter 7.

The superimposing of the torques resulting from these power portions or components will, over the major portion of the velocity range involved for such superimposing, with not too great auxiliary machine powers employable for the traction, bring about a more favorable distribution of the pulling force over the trucks than would be the case with the same combination of the driving machine but without the employment of the invention, if the total power of one gas turbine were distributed to one truck and the power of the auxiliary driving machine were distributed over the other truck.

Figure 7:
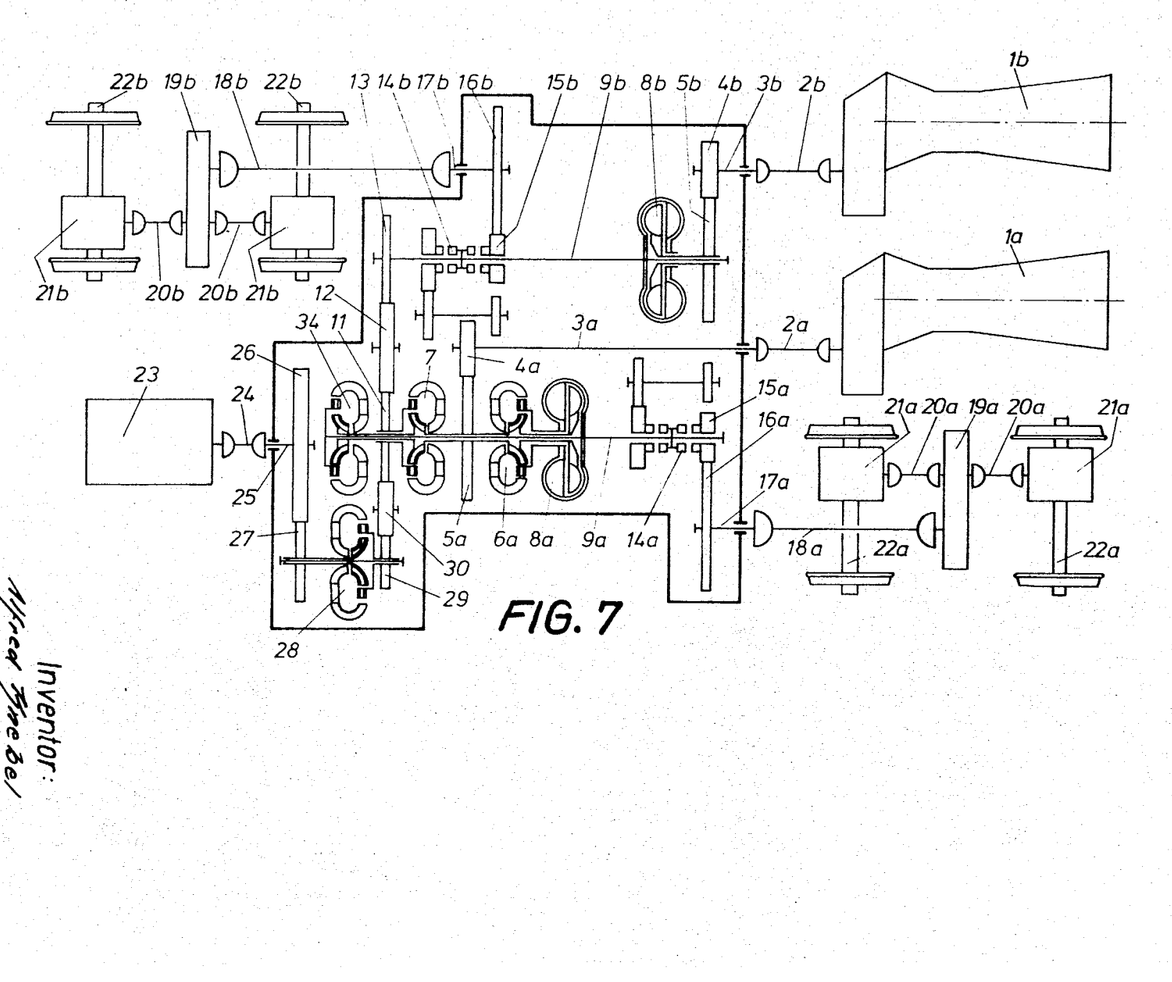
FIG. 7 shows a slight modification of FIG. 6 by replacing the branch coupling employed in the embodiment of FIG. 6 by a torque converter.

With great outputs of the auxiliary driving machines which are employed for the traction within a limited velocity range, it may, however, for instance also occur that the separate drive of the axles 22b by the auxiliary machine 23 and the separate drive of the axles 22a by the gas turbine 1a bring about a more favorable distribution of the pulling force. If, in such an instance, the advantages of the branch coupling 10, effective in the upper velocity range, are not necessary or desired, it is possible instead to provide a converter 34 as illustrated in FIG. 7. The converter 34 which when the converter 7 is not operating, is together with the converter 6a driven by the gas turbine 1a through the joint shaft 2a, transmission driving shaft 3a, pair of gears 4a and 5a, will transmit the driving power to the intermediate shaft 9a from where the entire driving power of the gas turbine 1a is conveyed to the axles 22a. In view of the fact that converter 7 is not filled, the output 11, 12, 13 conveys only the power of the tractionauxiliary driving machine 23 onto the intermediate shaft 9b which latter will then drive the axles 22b.

Figure 8:
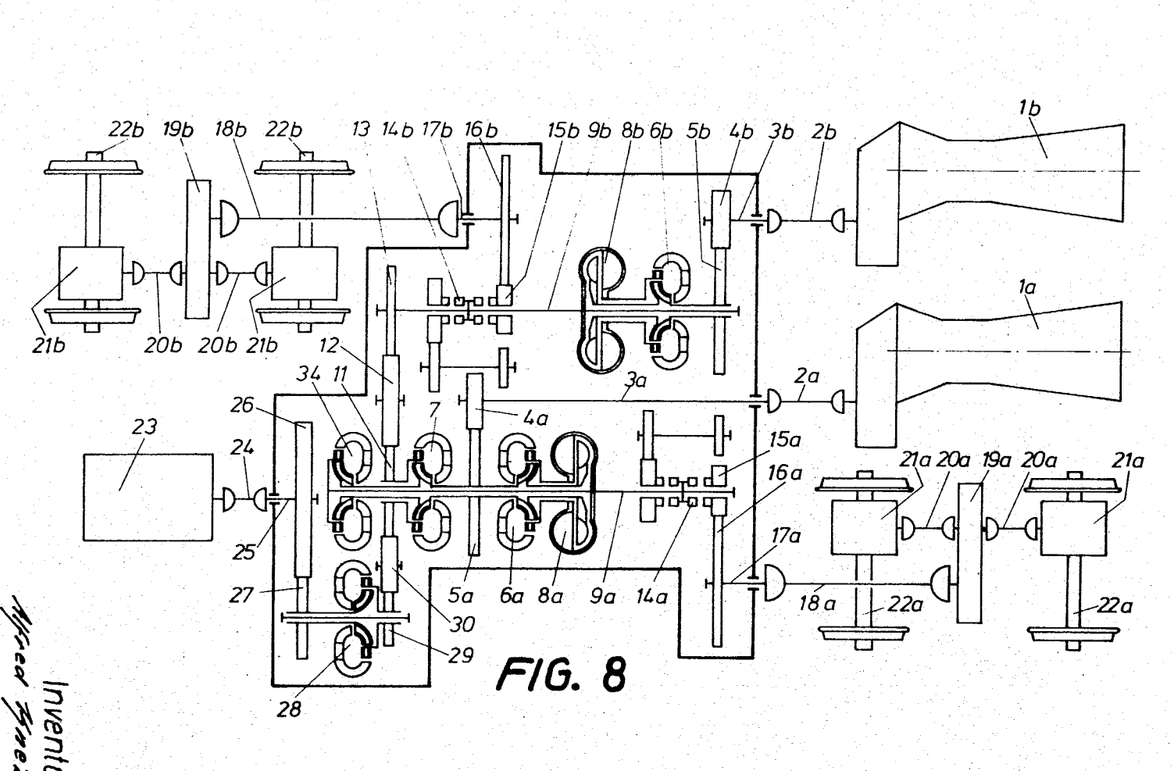

With vehicles requiring a rather high pulling force within the converter range and under favorable friction conditions, the driving power of both gas turbines 1a and 1b may be employed for the developing of the pulling force when, as illustrated in FIG. 8 the driving system of FIG. 7 is supplemented by the converter 6b. The drive of the axles 22a by the gas turbine 1a is effected through the intervention of the converter 6a and 34 as previously outlined with the system of FIG. 7 and the power flow to the axles 22b from the gas turbine 1b is effected through the joint shaft 2b, main transmission driving shaft 3b, pair of gears 4b and 5b, hydrodynamic torque converter 6b, intermediate shaft 9b, direction control sleeve 14b (engaging with 15b), pair of gears 15b and 16b, transmission output shaft 17b, joint shaft 18b, distributing transmission 19b, joint shafts 20b, and axle transmission 21b.

The embodiment of FIG. 8 which differs from the arrangement of FIG. 6 by the replacement of the branch coupling 10 by the converter 34 driven by gas turbine 1a and by the additional provision of converter 6b driven by gas turbine 1b, may also be equipped with a branch coupling 10 which is particularly advantageous for an economic exploitation of the gas turbine power in the upper velocity ranges. Expediently, the branch coupling 10 which in the embodiments of FIGS. 2, 5 and 6 is driven by the intermediate shaft 9a may, according to the embodiment of FIG. 9, be driven by the intermediate shaft 9b.

Figure 9:
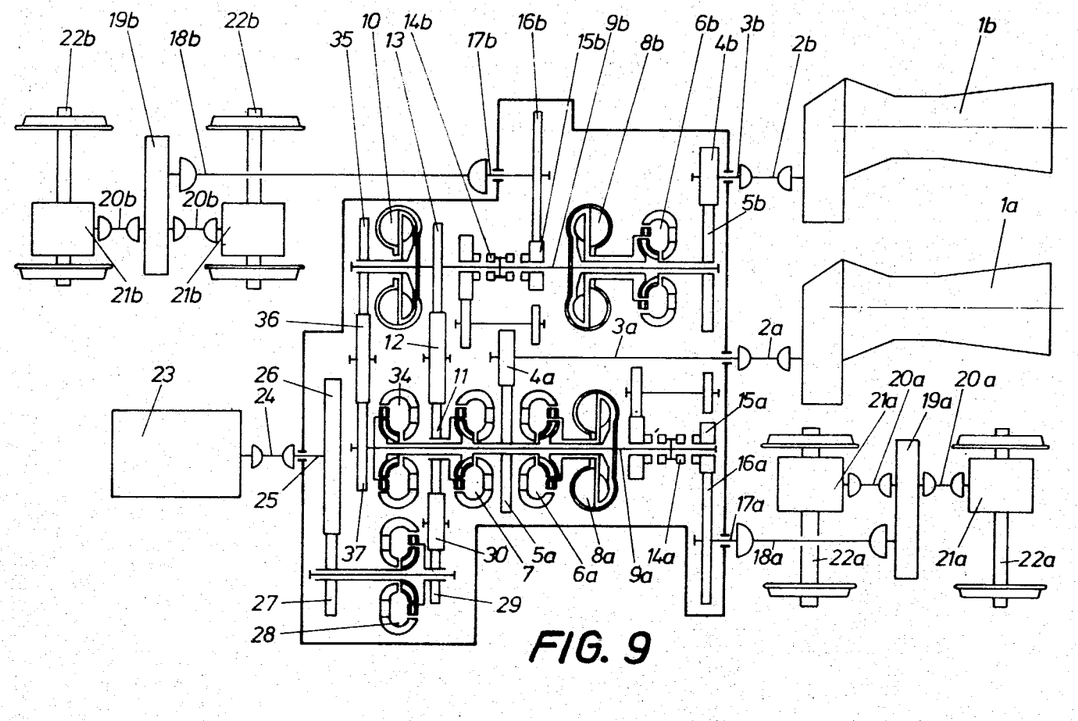
FIG. 9 differs from FIGS. 2, 5 and 6, in that the branch coupling which in said figures is driven by one intermediate shaft is, according to FIG. 9, driven by a different intermediate shaft.

In view of this difference in the drive of the branch coupling 10 according to the system of FIG. 9 over the embodiments of FIGS. 2, 5 and 6, it will be appreciated that in those conditions of operation in which for the necessary development of pulling power in the coupling range the power of a gas turbine is sufficient, not the gas turbine 1a but gas turbine 1b is taken into operation. The entire driving power of the gas turbine 1b will, in such an instance be conveyed to the intermediate shaft 9b through the intervention of coupling 8b. Expediently, half of the driving power is, by means of the hydrodynamic branch coupling 10 driven by the intermediate shaft 9b branched off and is conveyed through gears 35, 36 and 37 to the intermediate shaft 9a. The intermediate shafts 9a and 9b each transfer half of the driving power of the gas turbine 1b to the axles 22a and 22b whereby the same driving symmetry is realized as has been described in connection with the embodiments of FIGS. 2, 5 and 6.

The distribution of the traction power in the converter range as furnished by the gas turbine 1a will, after driving power of this gas turbine is sufficient, be the same with all illustrated hydrodynamic power transmission installations.

The employment of the invention is by no means limited to such hydrodynamic power transmission plants which, as illustrated in the above described embodiments of the invention, form a transmission unit.

The hydraulic transmission plant may if resulting in advantages be divided into a plurality of transmission units if the same can be coupled to each other in such a way that between the same the necessary torque transmissions can be realized.

Figure 10:
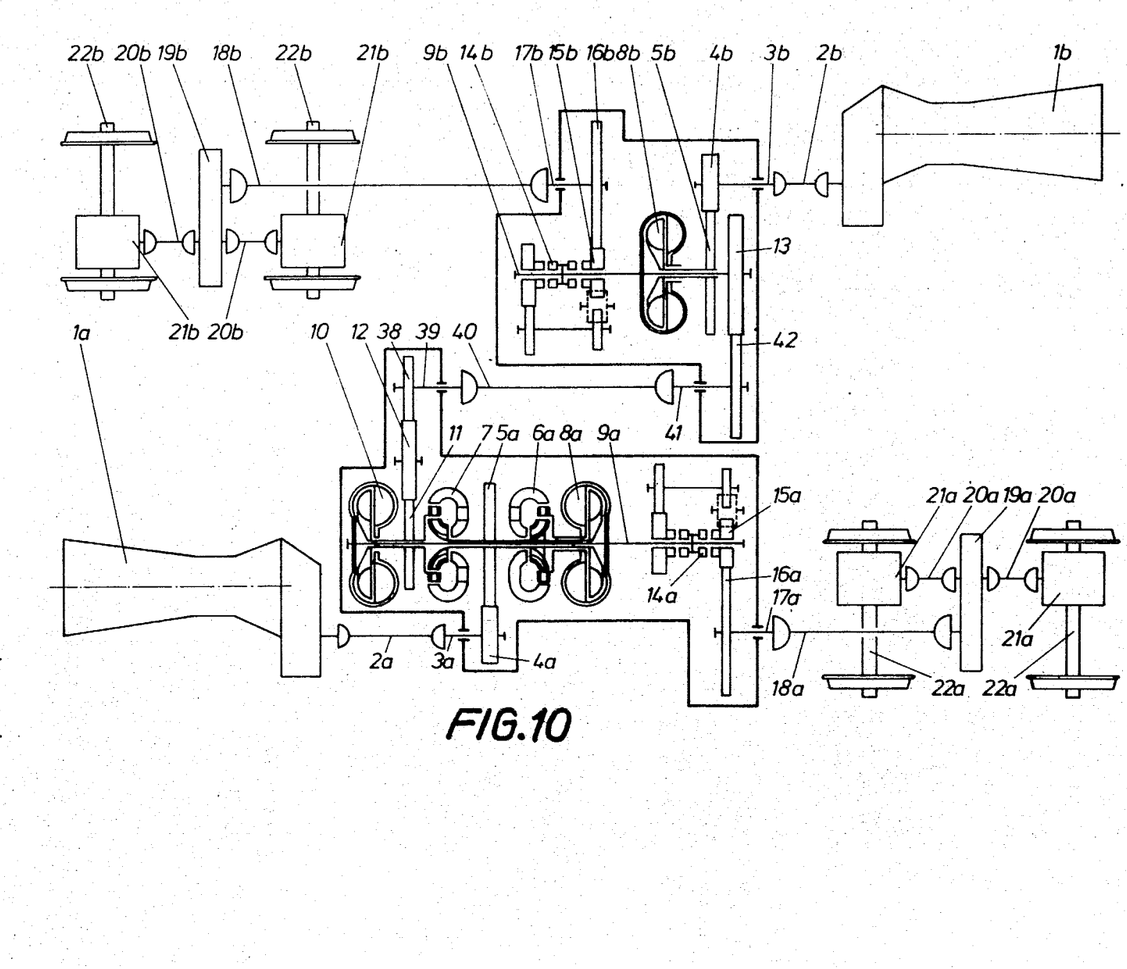
FIG. 10 shows a modification with hydraulic power transfer system which is subdivided in two transmission units and differs from FIG. 2 primarily with regard to the torque transferring elements of the output from the torque converter and from the coupling to an intermediate shaft.

A system derived from the embodiment of FIG. 2 and comprising a hydraulic power transmission plant divided into two transmission units is illustrated in FIG. 10. Such system differs from the above mentioned embodiment of FIG. 2 primarily by the design of the torque converting elements of the output of the converter 7 and the coupling 10 to the intermediate shaft 9b. This output drive which in the embodiment of FIG. 2 comprises the gears 11, 12 and 13 includes gears 11, 12, 38, the shaft 39, joint shaft 40, shaft 41, and the pair of gears 42 and 13.

It is, of course, to be understood that the present invention is, by no means, limited to the particular showing in the drawings, but also comprises any modifications within the scope of the appended claims.

What is claimed is:

1. In a driving system in combination for high output self-propelled rail vehicles as well as for a group of such vehicles coupled together; at least two selectively operable independent sources of power, at least two axles to be driven, power transmission means having respective input means connected to respective ones of said sources of power and respective output means connected to respective ones of said axles, power transmitting means interposed between said input means and said output means, and control means selectively operable for controlling said power transmitting means to control the connection of said input means to said output means whereby with a single said power source in operation a greater number of said axles can receive power therefrom as from the same power source with more than one of said power sources in operation.

2. A driving system in combination according to claim 1 in which said sources of power are gas turbines as independent driving units having outputs capable of only limited control variation.

3. A driving system in combination according to claim 2 in which said power transmitting means comprise fluid flow components and said control means comprises means for the selective filling and emptying of said fluid flow components.

4. A driving system in combination according to claim 2 in which said power transmitting means comprise rotary electrically operable components and circuits connected thereto and said control means includes switches in said circuits adjustable to make the components selectively effective and ineffective.

5. A driving system in combination according to claim 2 in which at least one of said axles forms a part of a vehicle other than the vehicle in which said sources of power are carried.

6. A driving system in combination according to claim 3 in which said sources of power include first and second power sources and said axles include first and second axles, said fluid flow components comprising first and second fluid flow devices having their input sides connected together and to said first power source and their output sides connected to said first and second axles respectively, said fluid flow components also comprising third and fourth fluid flow devices having their output sides connected to said first and second axles respectively, the input side of said third fluid flow device being connected to said first source of power and the output side of said fourth fluid flow device being connected to the output side of said second fluid flow device, said fluid flow components also comprising a fifth fluid flow device having its input side connected to said second source of power and its output side connected to said second axle.

* * * * *